Feb. 19, 1946.    N. JELDERKS    2,395,124
MACHINE FOR USE IN HARVESTING FRUIT FROM LOW GROWING PLANTS
Filed Dec. 22, 1944    2 Sheets-Sheet 1

INVENTOR
Neus Jelderks
BY
J. E. Trahneco
ATTORNEY.

Feb. 19, 1946.  N. JELDERKS  2,395,124
MACHINE FOR USE IN HARVESTING FRUIT FROM LOW GROWING PLANTS
Filed Dec. 22, 1944  2 Sheets-Sheet 2

INVENTOR
Neus Jelderks
BY
J. E. Trabucco
ATTORNEY.

Patented Feb. 19, 1946

2,395,124

UNITED STATES PATENT OFFICE 2,395,124

MACHINE FOR USE IN HARVESTING FRUIT FROM LOW GROWING PLANTS

Neus Jelderks, San Jose, Calif.

Application December 22, 1944, Serial No. 569,662

4 Claims. (Cl. 214—83)

This invention relates to improvements in harvesting equipment, and more particularly to a novel machine for use in harvesting melons, cucumbers or other fruit from low growing plants.

An object of my invention is to provide an improved machine of the kind characterized having a novel conveyance upon which a number of pickers may be comfortably supported in positions where they can conveniently harvest the fruit growing on vines or other low growing plants arranged along the path of travel of the machine.

Another object of my invention is to provide an improved machine adapted for use in harvesting fruit or vegetables growing on low growing plants, having novel means for automatically conveying the picked fruits to points where it is sacked.

Other and further objects of my invention will be pointed out hereinafter, or will be indicated in the appended claims, or will be obvious to one skilled in the art upon an understanding of the present disclosure. For the purpose of this application I have elected to show herein certain forms and details of a fruit harvester representative of my invention; it is to be understood, however, that the embodiment of my invention herein shown and described is for the purpose of illustration only, and that therefore it is not to be regarded as exhaustive of the variations of the invention, nor is it to be given an interpretation such as might have the effect of limiting the claims, short of the true and most comprehensive scope of the invention in the art.

Figure 1:
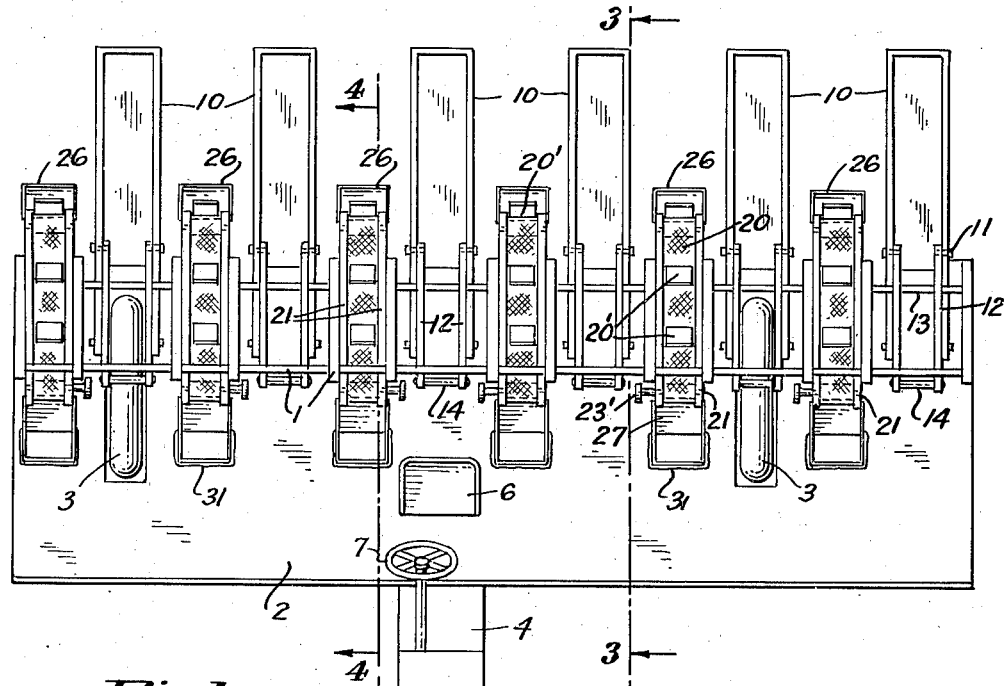
Fig. 1 is a plan view of a machine embodying my invention.
Figure 2:
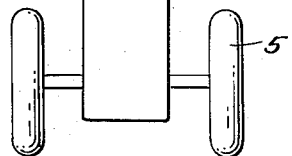
Fig. 2 is a plan view of a part of the machine, showing the drive means in detail.
Figure 2:
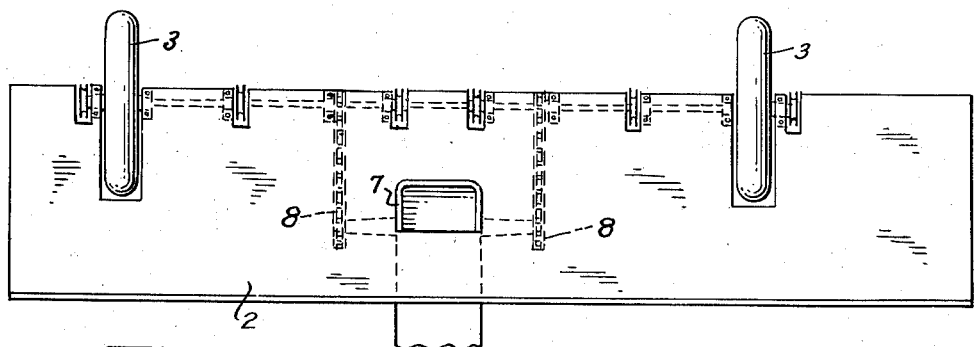

Referring to the drawings the numeral 1 designates a supporting structure, 2 a platform carried at the forward end of the supporting structure, 3 the rear wheels upon which the platform and the supporting structure are mounted, and 4 a forwardly disposed chassis connected to the supporting structure and mounted on front wheels 5. A driver's seat 6 on the platform is positioned behind a steering wheel 7 connected in the usual manner to the front wheels 5. The power plant (not shown) for operating the machine is mounted on the chassis 4, and suitable means, including a chain and sprocket drive 8, connects the said power plant to a rotatable drive shaft 9 which is journaled on the supporting structure 1. The rear wheels 3 are keyed to the shaft 9, and suitable controls (not shown) are arranged within reach of the driver for connecting and disconnecting the power plant and the shaft to effect the control of the machine's forward movement and also the conveyors.

Adjustably carried on the supporting structure 1 are rearwardly disposed elongated spaced supports 10 which are adapted to support a number of fruit pickers or harvesters. The bed of each of the supports 10 is designed to support a person in a comfortable position near the ground level where he can reach the cucumbers or other fruit on plants growing in cultivated rows at opposite sides of intervening ditches. In normal usage the wheels 3 and 5, operate in the ditches between the rows of plants, and the supports 10 are also positioned between the said rows as the machine slowly moves forwardly. The supports 10 are arranged in substantially horizontal positions, and each is capable of independent vertical adjustment. Since the supporting and adjusting means for the supports is the same in each instance, a description of one will suffice for all. Pivotally connected to opposite sides of the support 10 just forwardly of its central part, as at 11, are spaced inclined bars 12. The bars are pivotally connected to a transverse rod 13 at the rear end of the supporting structure 1, and their rear ends are joined by a cross member 14 which serves as a handle for tilting the bars about 13 to raise or lower the supports 10. Pivotally connected as at 15 to the forward end of the support 10 are spaced links 16 which are connected as at 17 to the supporting structure 1. The distance between the pivots 15 and 17 associated with the links 16 is substantially the same as the intervening space between the pivots 11 and 13 of the bars 12. Thus when the forward ends of the bars 12 are raised or lowered the supporting structure will remain substantially horizontal. Suitable means for maintaining the support in an adjusted position comprises an arcuate rack 18 secured to the supporting structure 1, and a spring pressed pivoted pawl 19 carried by one of the bars 12. The pawl engaging with the teeth of the rack 18 prevents the upper ends of the bars 12 from being carried rearwardly beyond a certain adjusted position when a picker is supported on the support 10. The support is thereby held in a suitably adjusted position with respect to the ground level.

Arranged between and at the sides of the supports 10 and their adjustable mounting means are a number of inclined endless conveyors 20 which receive the fruit deposited thereon and convey it to a location above the platform 2 where it is sacked. A number of spaced cups 20 are secured to each conveyor. Since the conveyors are the same, a description of one will suffice for all. Secured to the supporting structure 1 are two inclined parallel supporting members 21 arranged at opposite edges of the endless conveyor 20. The supporting members 21 provide sides at opposite edges of the conveyor for preventing the fruit being conveyed by the latter from dropping therefrom. The endless conveyor 20 extends over rotatable rollers 22 and 23 mounted, respectively, at the lower and upper ends of the supporting members 21. A pulley 23' connected to the upper roller 23 is connected by an endless belt 24 to a pulley 25 secured to the shaft 9. The rotation of the shaft 9 will cause the operation of the endless conveyor 20. Secured to the lower end of the supporting members 21 and positioned in spaced relation to the endless conveyor 20 is a receiving hopper 26. As the endless conveyor 20 travels as indicated by the arrow in Fig. 4, the cups 20' pick up the fruit deposited by the picker in the hopper 26 and support it while it is being conveyed in an upward direction. Some of the fruit may be deposited directly on the endless conveyor rather than in the hopper, and in such an event the cups will engage therewith and prevent it from sliding backwardly. It is to be noted that the speed of operation of the endless conveyor 20 may be increased or decreased by varying the respective sizes of the pulleys 23' and 25. If desired a suitable clutch mechanism may be provided with each conveyor for its independent connection or disconnection with respect to the shaft 9.

Figure 3:
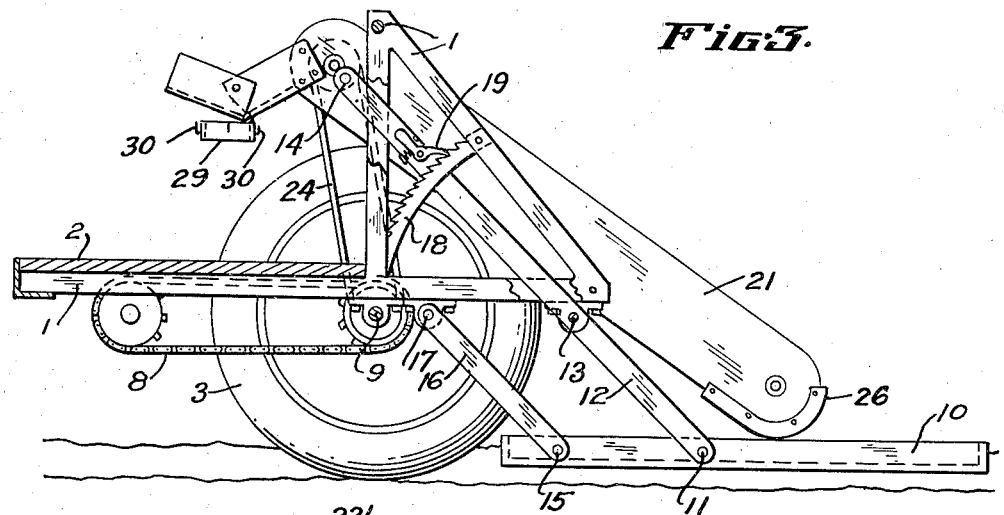
Fig. 3 is an enlarged sectional view taken on the line 3—3 of Fig. 1.
Figure 4:
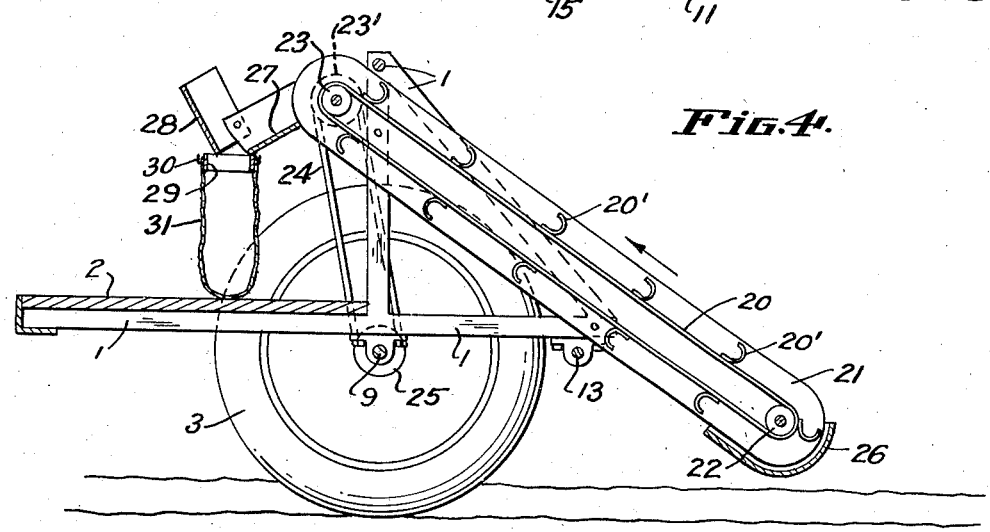
Fig. 4 is an enlarged sectional view taken on the line 4—4 of Fig. 1.
Figure 5:
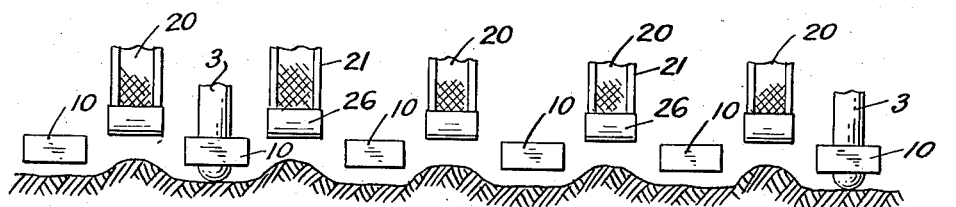
Fig. 5 is a diagrammatic view showing the relative positions of certain parts of the machine with respect to the cultivated rows normally having the fruit bearing plants thereon.

Secured to the supporting structure 1 and arranged to receive the fruit discharges from the upper end of the endless conveyor 20 is an inclined chute 27 having a pivoted tray 28 at its lower end. In normal practice the tray is positioned as shown in Fig. 4 so that it does not interfere with the discharge of fruit from the chute 27, but when it is desired to have the chute serve as a receptacle for holding some of the fruit delivered thereto by the endless conveyor, it is tilted backwardly as shown in Fig. 3. The fruit is thereupon intercepted by the tray and prevented from falling from the chute. Usually after a sack is filled it is necessary to replace it with one that is empty, and it is then that the tray is positioned to prevent the fruit delivered to the chute 27 from falling onto the platform. Supported on the lower end of the chute 27 is an open frame 29 having hooks 30 for securing the open end of a sack 31 in a position where it is adapted to receive the fruit falling from the chute.

It is contemplated that the machine be made up of a number of units comprising a support 10, a conveyor 20 and their related parts, provision being made for increasing or decreasing the number of such units depending upon the number of pickers required for harvesting the crop. In actual practice and operator standing on the platform 2 may attend to the filling of the sacks, which, after being closed at their upper ends, may be piled on the platform or placed on the ground at the side of the machine.

Having described my invention, what I claim is:

1. In a machine for the purpose described, a portable supporting structure mounted on wheels, a plurality of supports arranged in spaced relation above but near the ground level, the said supports being adapted to support fruit or vegetable pickers in positions where they are within reach of low growing plants, a plurality of inclined endless conveyors carried by the supporting structure and arranged with their receiving ends alongside the supports, means near the upper ends of the conveyors for receiving the produce discharged therefrom and a platform carried by the supporting structure and arranged to underlie and extend continuously beneath the discharge ends of the conveyors.

2. In a machine for the purpose described, a portable supporting structure mounted for movement over beds of plants from which their produce is to be harvested, a plurality of adjustable supports for fruit or vegetable pickers carried by the supporting structure and arranged in spaced relation above but near the ground level, means for adjusting the height of the supports, a plurality of endless conveyors carried by the supporting structure and arranged with their receiving ends alongside the supports and a platform carried by the supporting structure and arranged to extend continuously beneath the discharge ends of the conveyors.

3. In a machine for the purpose described, a portable supporting structure mounted for movement over beds of plants from which their produce is to be harvested, a plurality of adjustable fruit or vegetable picker supports carried by the supporting structure and arranged in spaced relation above but near the ground level, independent means for adjusting the height of each of the supports, endless conveyors mounted in spaced relation on the supporting structure and arranged with their receiving ends near the supports, means at the discharge end of the conveyors for receiving the produce discharged therefrom and a continuous platform extending beneath the produce receiving means.

4. In a machine for the purpose described, a vehicle having a supporting structure, a plurality of supports carried by the supporting structure and arranged in spaced relation in positions near but above the ground level, means for independently adjusting the height of the supports, and a plurality of endless conveyors arranged near the supports for receiving the produce picked by the pickers.

NEUS JELDERKS.